(12) United States Patent
Visitacion et al.

(10) Patent No.: US 10,269,222 B2
(45) Date of Patent: Apr. 23, 2019

(54) SYSTEM WITH WEARABLE DEVICE AND HAPTIC OUTPUT DEVICE

(71) Applicant: IMMERSION CORPORATION, San Jose, CA (US)

(72) Inventors: Allan Visitacion, Fremont, CA (US); Trevor Jones, Los Gatos, CA (US); Daniel Gregory Parker, San Francisco, CA (US); Kohei Imoto, Santa Clara, CA (US); Keith Reed, San Jose, CA (US); Jesica E. Ferro, Redwood City, CA (US); Aaron Kapelus, Montreal (CA); Neil Olien, Montreal (CA); Danny A. Grant, Laval (CA); Robert Lacroix, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 14/808,740

(22) Filed: Jul. 24, 2015

(65) Prior Publication Data

US 2015/0332566 A1 Nov. 19, 2015

Related U.S. Application Data

(63) Continuation of application No. 13/841,551, filed on Mar. 15, 2013, now Pat. No. 9,092,954.

(51) Int. Cl.
*G08B 6/00* (2006.01)
*G06T 19/00* (2011.01)
*G06F 3/01* (2006.01)

(52) U.S. Cl.
CPC ............... *G08B 6/00* (2013.01); *G06F 3/011* (2013.01); *G06F 3/016* (2013.01); *G06T 19/006* (2013.01)

(58) Field of Classification Search
CPC ............ G06F 3/016; G06F 3/011; G06T 1/00; G06T 19/006; G02B 27/017; G02B 25/001
USPC ............. 340/407.1, 539.13, 539.2, 566, 665, 340/691.1; 345/633, 7
See application file for complete search history.

(56) References Cited

U.S. PATENT DOCUMENTS

| 7,584,158 | B2 * | 9/2009 | Iwaki | G06F 3/011 706/45 |
| 9,189,021 | B2 * | 11/2015 | Jerauld | G06F 1/163 |
| 9,215,293 | B2 * | 12/2015 | Miller | H04L 67/38 |

(Continued)

FOREIGN PATENT DOCUMENTS

| CN | 101498845 A | 8/2009 |
| CN | 101797197 A | 8/2010 |

(Continued)

OTHER PUBLICATIONS

Extended European Search Report for Application No. 14159943.1 dated Dec. 20, 2016.

(Continued)

*Primary Examiner* — Phung Nguyen
(74) *Attorney, Agent, or Firm* — Miles & Stockbridge P.C.

(57) ABSTRACT

A system includes a wearable device, a second device remote from and in communication with the wearable device, a processor configured to generate a control signal representative of an event occurring in an environment related to the wearable device and/or the second device, and a haptic output device configured to provide haptic feedback based on the generated control signal.

29 Claims, 6 Drawing Sheets

(56) References Cited

U.S. PATENT DOCUMENTS

| | | | |
|---|---|---|---|
| 9,367,136 B2 | 6/2016 | Latta et al. | |
| 9,370,459 B2 | 6/2016 | Mahoney | |
| 9,370,704 B2 | 6/2016 | Marty | |
| 9,392,094 B2 | 7/2016 | Hunt et al. | |
| 9,462,262 B1 | 10/2016 | Worley, III et al. | |
| 9,626,805 B2 | 4/2017 | Lampotang et al. | |
| 9,645,646 B2 | 5/2017 | Cowley et al. | |
| 9,652,037 B2 | 5/2017 | Rubin et al. | |
| 9,760,166 B2 | 9/2017 | Ammi et al. | |
| 9,811,854 B2 | 11/2017 | Lucido | |
| 9,851,799 B2 | 12/2017 | Keller et al. | |
| 9,933,851 B2 | 4/2018 | Goslin et al. | |
| 9,948,885 B2 | 4/2018 | Kurzweil | |
| 2010/0007474 A1* | 1/2010 | Behm | A61H 3/061 340/407.1 |
| 2010/0079356 A1 | 4/2010 | Hoellwarth | |
| 2010/0110368 A1 | 5/2010 | Chaum | |
| 2011/0213664 A1 | 9/2011 | Osterhout et al. | |
| 2012/0229264 A1* | 9/2012 | Company Bosch | G06F 3/016 340/407.1 |
| 2012/0242698 A1* | 9/2012 | Haddick | G02B 27/0093 345/633 |
| 2013/0314303 A1* | 11/2013 | Osterhout | G06F 3/005 345/8 |
| 2013/0342570 A1* | 12/2013 | Kinnebrew | G09G 3/003 345/633 |
| 2015/0268721 A1* | 9/2015 | Joo | G02B 27/0093 345/156 |
| 2016/0070348 A1 | 3/2016 | Cowley et al. | |
| 2016/0084605 A1 | 3/2016 | Monti | |
| 2016/0086457 A1 | 3/2016 | Baron et al. | |
| 2016/0163227 A1 | 6/2016 | Penake et al. | |
| 2016/0166930 A1 | 6/2016 | Brav et al. | |
| 2016/0169635 A1 | 6/2016 | Hannigan et al. | |
| 2016/0170508 A1 | 6/2016 | Moore et al. | |
| 2016/0171908 A1 | 6/2016 | Moore et al. | |
| 2016/0187969 A1 | 6/2016 | Larsen et al. | |
| 2016/0187974 A1 | 6/2016 | Mallinson | |
| 2016/0201888 A1 | 7/2016 | Ackley et al. | |
| 2016/0209658 A1 | 7/2016 | Zalewski | |
| 2016/0214015 A1 | 7/2016 | Osman et al. | |
| 2016/0214016 A1 | 7/2016 | Stafford | |
| 2016/0375170 A1 | 12/2016 | Kursula et al. | |
| 2017/0102771 A1 | 4/2017 | Lei | |
| 2017/0103574 A1 | 4/2017 | Faaborg et al. | |
| 2017/0131775 A1 | 5/2017 | Clements | |
| 2017/0148281 A1 | 5/2017 | Do et al. | |
| 2017/0154505 A1 | 6/2017 | Kim | |
| 2017/0168576 A1 | 6/2017 | Keller et al. | |
| 2017/0168773 A1 | 6/2017 | Keller et al. | |
| 2017/0178407 A1 | 6/2017 | Gaidar et al. | |
| 2017/0203221 A1 | 7/2017 | Goslin et al. | |
| 2017/0203225 A1 | 7/2017 | Goslin | |
| 2017/0206709 A1 | 7/2017 | Goslin et al. | |
| 2017/0214782 A1 | 7/2017 | Brinda | |
| 2017/0257270 A1 | 9/2017 | Goslin et al. | |
| 2017/0352185 A1 | 12/2017 | Bonilla Acevedo et al. | |
| 2018/0050267 A1 | 2/2018 | Jones | |
| 2018/0053351 A1 | 2/2018 | Anderson | |
| 2018/0077978 A1 | 3/2018 | Keller et al. | |
| 2018/0081436 A1 | 3/2018 | Keller et al. | |
| 2018/0093181 A1 | 4/2018 | Goslin et al. | |
| 2018/0107277 A1 | 4/2018 | Keller et al. | |
| 2018/0120936 A1 | 5/2018 | Keller et al. | |

FOREIGN PATENT DOCUMENTS

| | | |
|---|---|---|
| CN | 102175251 A | 9/2011 |
| CN | 102906623 A | 1/2013 |
| CN | 102907008 A | 1/2013 |
| CN | 104127301 A | 11/2014 |
| GB | 2487672 A | 1/2012 |
| JP | 200175705 A | 3/2001 |
| JP | 20041773660 A | 6/2004 |
| WO | 2011/119233 A1 | 9/2011 |
| WO | 2011106798 A1 | 9/2011 |
| WO | 2012105175 A1 | 8/2012 |

OTHER PUBLICATIONS

Arinobu Niijama et al., "Analysis on Influence of Visual Stimuli on Localization of Tactile Stimuli in Augmented Reality", Transactions of the Virtual Reality Society of Japan, Jun. 30, 2012, vol. 17, No. 2, pp. 73-78.

* cited by examiner

SYSTEM WITH WEARABLE DEVICE AND HAPTIC OUTPUT DEVICE

CROSS-REFERENCE TO RELATED APPLICATIONS

This application is a continuation application claiming the benefit of priority of U.S. patent application Ser. No. 13/841,551, filed Mar. 15, 2013, now U.S. Pat. No. 9,092,954, the entire content of which is incorporated herein by reference.

FIELD

The present invention relates to a system with a wearable device, a second device, and a haptic output device that is configured to generate feedback based on an event that occurs in an environment related to the wearable device and/or the second device.

BACKGROUND

Augmented reality devices provide an augmented reality environment in which physical objects in a physical space are concurrently displayed with virtual objects in a virtual space. Various augmented reality devices recognize specific codes (e.g., QR codes) disposed on physical objects and display one or more virtual objects in a view that includes the physical objects augmented with the virtual objects based on the specific codes. Other augmented reality devices can recognize specific, known physical objects using image recognition such as by transmitting images to a server that performs the image recognition.

Despite advances in augmented reality systems, the ability to interact with an augmented virtual environment is limited. Providing useful feedback to the user is also limited. In addition, recognizing objects in the virtual reality environment may be computationally intensive and reduce usability in many instances.

SUMMARY

The disclosure relates to a wearable device that is configured to generate feedback based on an event that occurs in an environment related to the wearable device. The wearable device may comprise, for example, a processor configured to generate a control signal representative of an event occurring in an environment related to the wearable device and at least a first haptic output device disposed at a first position at the wearable device, where the first haptic output device may be configured to provide haptic feedback based on the generated control signal.

The wearable device may comprise, for example, a processor, an input component, a feedback component, a communication port, an imaging component, a storage, and/or other components. The input component may be configured to receive an input such as, for example, a button press, a gesture, voice command, and/or other input. The feedback component may be configured to provide feedback via the wearable device. The communication port may include an interface through which a communication channel may be maintained with, for example, a server, and/or other devices. The imaging component such as a camera may be configured to image the physical space related to the wearable device. In some implementations, the imaging component of the wearable device may comprise, an infrared detector, and/or another image recording device. The storage of the wearable device may store data related to events In some implementations, the processor of the wearable device may be configured to execute one or more modules, including, for example, an event handler module, a control signal generation module, a feedback control module, a communication module, an object recognition module, and/or other computer program modules. The event handler module may be configured to detect whether an event occurs in the environment related to the wearable device. The control signal generation module may be configured to receive information relating to an event and generate a control signal. The control signal may be representative of the event occurring in an environment related to the wearable device. The feedback control module may be configured to receive a control signal and cause the feedback component to provide feedback. The communication module may be configured to facilitate communication between the wearable device and another device. The object recognition module may be configured to recognize physical objects in the physical space related to the wearable device.

The event may include, for example, an indication of a physical object within a predetermined proximity of the wearable device, an indication of an environmental condition occurring in the environment, an indication of a change in an environmental condition occurring in the environment, an indication of a movement of an object within a predetermined proximity of the wearable device, an interaction between the wearable device and an object in the environment, an indication that the wearable device recognizes an object in the environment, a navigation event, and/or another event occurring in an environment related to the wearable device.

In some implementations, the feedback control module may be configured to provide the control signal to the feedback component. In some of these implementations, the control signal may be directly applied to the feedback component to cause the feedback. In some implementations, the feedback control module may be configured to determine a feedback signal based on the received control signal. In these implementations, the feedback control module may consult a lookup table to determine the feedback signal based on the received control signal.

The communication module may be configured to facilitate communication between the wearable device and another device such as, for example, a server, and/or other devices that may be in communication with the wearable device. The communication module may be configured to provide a wired or wireless communication channel for communication between the wearable device, the server, and/or another device. In some implementations, the processor may be configured to receive a signal representative of an event occurring at another computing device via a wireless or wired communication channel of the communication module.

In some implementations, the object recognition module may be configured to recognize objects in a physical space. The object recognition module may communicate with the imaging component and the storage of the wearable device to recognize an object in the physical space. For example, the object recognition module may receive visual data captured from the imaging component and may process the visual data to determine whether one or more objects exist in the captured visual data. The object recognition module may compare the captured objects that exist in the visual data with objects stored in the storage.

The input component may be configured to receive an input such as, for example, a button press, a gesture, voice command, and/or another type of communication. The input may be communicated, by the processor, to another device such as, for example, server and/or another device in communication with the wearable device, via the communication channel. For example, the input component may include a touch pad, a touch screen, a mechanical button, a switch, an audio receiver, such as a microphone, and/or another input component that can receive an input.

In some implementations, the feedback component may comprise one or more haptic output devices configured to provide haptic feedback, one or more visual devices configured to provide a visual feedback, one or more audio devices configured to provide an audible feedback, and/or another device that produces feedback.

The haptic output device may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers, or shape memory alloys, a macro-composite fiber actuator, an electro-static actuator, an electro-tactile actuator, and/or another type of actuator that provides a physical feedback such as a haptic (e.g., vibrotactile) feedback. The haptic output device may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

The visual device may be configured to generate a visual feedback such as visible light at the wearable device. For example, the visual feedback may visually indicate the occurrence of an event in an environment related to the wearable device.

The audio device may be configured to generate audio feedback such as one or more sounds at the wearable device. For example, the audio feedback may audibly indicate the occurrence of an event in an environment related to the wearable device.

The feedback component may be configured to receive one or more signals (e.g., one or more control signals or one or more feedback signals) from the feedback control module. Based on the one or more signals, the one or more haptic output devices, one or more visual devices, one or more audio devices, and/or other feedback components may provide feedback via the wearable device.

The communication port may be configured to establish a communication channel with another device. The communication port may maintain an interface through which a communication channel may be maintained with another device such as, for example, a server, and/or other devices that may be in communication with the wearable device. In some implementations, a control signal may be received via the communication channel, which may include a wired or a wireless communication channel.

In some implementations, the wearable device may comprise a sensor. The sensor may be configured to sense one or more environmental conditions related to the wearable device.

In some implementations, the wearable device may be a wearable augmented reality ("AR") device configured to generate an augmented reality ("AR") environment comprising both an augmented reality space and a physical space. The wearable AR device may comprise, for example, an imaging device configured to image the physical space, one or more processors configured to generate the augmented reality space coincident with the physical space, recognize at least one physical object in the physical space and augment the physical object with one or more virtual objects in the AR space, determine an event associated with the AR environment, and generate a control signal based on the determined event, and at least a first haptic output device disposed at a first position at the wearable AR device, where the first haptic output device may be configured to provide haptic feedback based on the generated control signal.

In some implementations, the wearable AR device may comprise, for example, a processor, an input component, a feedback component, a communication port, an imaging component, a storage, and/or other components. The input component may be configured to receive an input such as, for example, a button press, a gesture, voice command, and/or other input. The feedback component may be configured to provide feedback via the wearable AR device. The communication port may comprise an interface through which a communication channel may be maintained with, for example, a server, and/or other devices. An imaging component such as a camera may be configured to image the physical space. In some implementations, the imaging component of the wearable AR device may comprise a camera, an infrared detector, and/or another image recording device. The processor may be configured to generate the augmented reality space coincident with the physical space. The processor may be configured to recognize at least one physical object in the physical space and augment the at least one physical object with one or more virtual objects in the AR space. The processor may be configured to determine an event within the AR environment and generate a control signal representative of that event. The control signal may cause feedback to be generated at the wearable AR device.

In some implementations, the processor of the wearable AR device may be configured to execute one or more modules, including, for example, an event handler module, a control signal generation module, a feedback control module, a communication module, an object recognition module, an object generation module, and/or other computer program modules. The event handler module may be configured to detect whether an event occurs in the augmented reality environment. The control signal generation module may be configured to receive information relating to an event and generate a control signal related to the event. The feedback control module may be configured to receive a control signal and cause the feedback component to provide the feedback. The communication module may be configured to facilitate communication between the augmented reality device and other devices such as a server. The object recognition module may be configured to recognize physical objects in the physical space. The object generation module may be configured to generate virtual objects to augment recognized physical objects.

In some implementations, an event determined by the processor of the wearable AR device may include an interaction between the at least one physical object and the augmented reality environment, a confirmation of an action occurring with respect to the augmented reality environment, a confirmation that the at least one physical object is recognized by the augmented reality device, a confirmation that an object in the physical space has been augmented, an indication of the at least one physical object within a predetermined proximity of the augmented reality device, an indication of an environmental condition occurring in an environment related to the augmented reality device, an indication of a change in an environmental condition occurring in the environment, an indication of a movement of an object within a predetermined proximity of the augmented reality device, and/or another occurrence in the augmented reality environment.

In some implementations, one or both of the wearable device and/or the wearable AR device may be configured as eyewear. For example, the eyewear may comprise one or more components, including, for example, a frame, a first lens connected to a first portion of the frame, a second lens connected to a second portion of the frame, a first nose pad connected to a first lens, a second nose pad connected to a second lens, and/or other components. The frame may comprise, for example, .a first top portion of the frame at a first end of the frame, a second top portion of the frame at a second end opposite the first end of the frame, a first temple connected to the first top portion and extending in a direction perpendicular to the first top portion, a second temple connected to the second top portion and extending in a direction perpendicular to the second top portion and parallel to the first temple, and/or other components. The first temple may comprise one or more portions including, for example, a first portion, a second portion and/or other portions. The second temple may comprise one or more portions including, for example, a first portion, a second portion, and/or other portions.

In some implementations, a first top portion of the frame may comprise one or more haptic output devices of the feedback component positioned at one or more respective positions of the frame. In some implementations, a second top portion of the frame may comprise one or more haptic output devices of the feedback component positioned at one or more respective positions of the frame. In some implementations, the first temple may comprise one or more haptic output devices positioned at one or more respective portions of the first temple. The second temple may comprise one or more haptic output devices positioned at one or more respective portions of the second temple.

In some implementations, the first temple may comprise a deformable material. In some of these implementations, the first temple may be configured to bend laterally inward. In some of these implementations, a first portion of the first temple may be configured to bend laterally inward and a second portion of the first temple adjacent the first portion may be configured to bend laterally inward or laterally outward. In some implementations, the second temple may comprise a deformable material. In some of these implementations, the second temple may be configured to bend laterally inward. In some of these implementations, a first portion of the second temple may be configured to bend laterally inward and a second portion of the second temple adjacent the first portion may be configured to bend laterally inward or laterally outward.

In some implementations, the first nose pad may comprise a deformable material. The first nose pad may be configured to bend laterally inward. In some implementations, the deformable material of the first temple, the second temple, the first nose pad, the second nose pad, and/or other components that comprise deformable material may provide feedback as one or more feedback components of the wearable device configured as eyewear.

In some implementations, the wearable AR device may be configured to display the AR environment via one or both lenses of the eyewear.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

DETAILED DESCRIPTION

Figure 1:
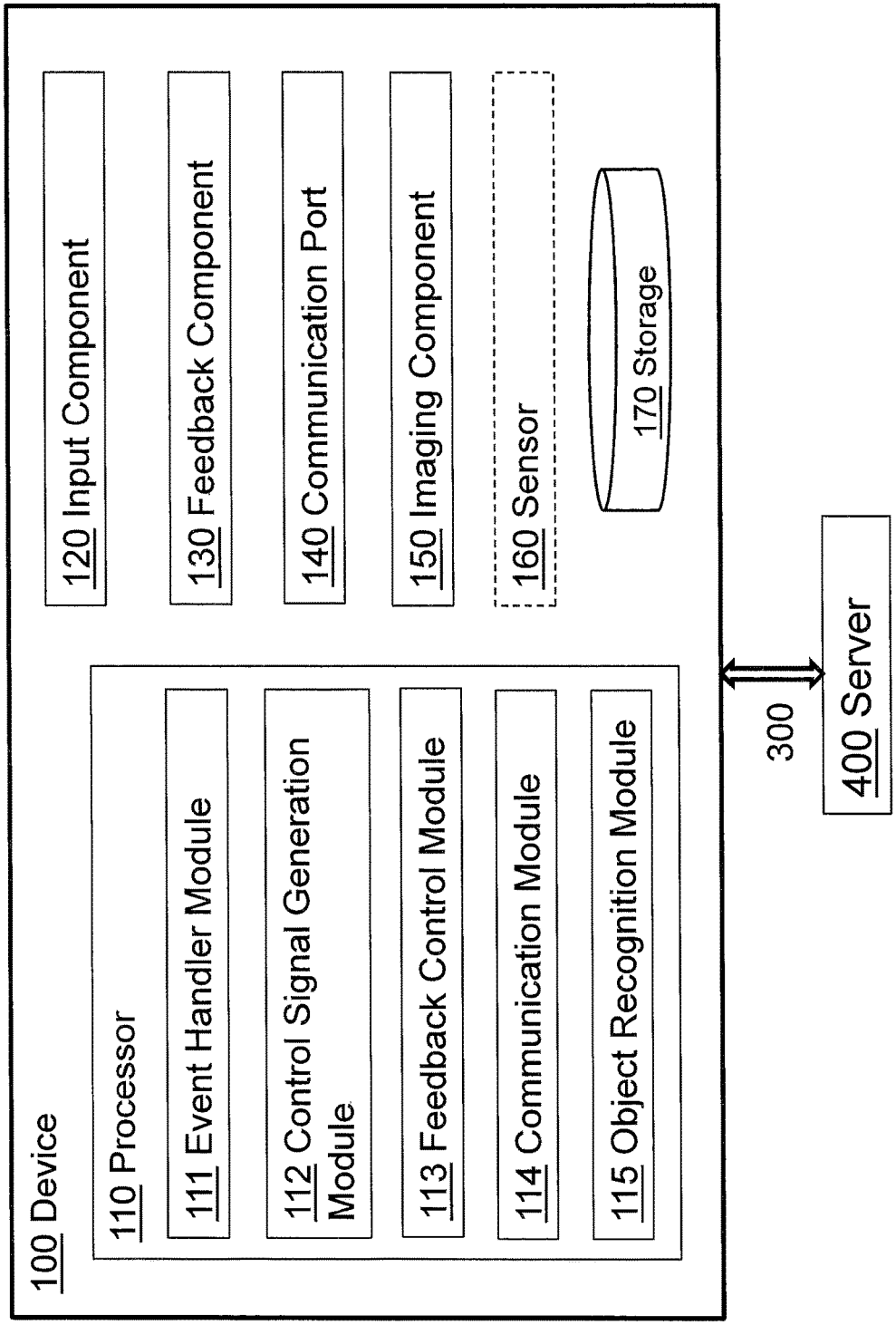
FIG. 1 illustrates a block diagram of an exemplary wearable device configured to provide feedback based on an event that occurs in an environment related to the wearable device, according to various implementations of the invention.

FIG. 1 illustrates a block diagram of an exemplary system 10 of providing feedback based on an event that occurs in an environment related to a wearable device 100. The system 10 may comprise the wearable device 100, a server 400, a communication channel 300, and/or other devices that may be in communication with the wearable device 100.

The wearable device 100 may be configured to generate feedback based on an event that occurs in an environment related to the wearable device 100. An event may include, for example, an indication of a physical object within a predetermined proximity of the wearable device 100, an indication of an environmental condition occurring in the environment, an indication of a change in an environmental condition occurring in the environment, an indication of a movement of an object within a predetermined proximity of the wearable device 100, an interaction between the wearable device 100 and an object in the environment, an indication that the wearable device 100 recognizes an object in the environment, a navigation event, and/or another event occurring in an environment related to the wearable device 100.

The wearable device 100 may comprise, for example, a processor 110 configured to generate a control signal representative of an event occurring in an environment related to the wearable device 100 and at least a first haptic output device (e.g., feedback component 130) disposed at a first position at the wearable device 100, where the first haptic output device (e.g., feedback component 130) may be configured to provide haptic feedback based on the generated control signal.

The wearable device 100 may also comprise, for example, an input component 120, a feedback component 130 configured to provide feedback (e.g., haptic feedback, a haptic effect, etc.) based on the generated control signal, a communication port 140, an imaging component 150, a storage 170, and/or other components. The input component 120 may be configured to receive an input such as, for example, a button press, a gesture, voice command, and/or other input. The feedback component 130 may be configured to provide feedback via the wearable device 100. The communication port 140 may include an interface through which a communication channel may be maintained with, for example, a server, and/or other devices. The imaging component 150 may be configured to image the physical space related to the wearable device 100. In some implementations, the imaging component 150 of the wearable device 100 may comprise a camera, an infrared detector, and/or another image recording device.

The storage 170 of the wearable device 100 may store data related to one or more events which the wearable device 100 may recognize. For example, the storage 170 of the wearable device 100 may store data related to events including, for example, an indication of a physical object within a predetermined proximity of the wearable device 100, an indication of an environmental condition occurring in the environment, an indication of a change in an environmental condition occurring in the environment, an indication of a movement of an object within a predetermined proximity of the wearable device 100, an interaction between the wearable device 100 and an object in the environment, an indication that the wearable device 100 recognizes an object in the environment, a navigation event, and/or another event occurring in an environment related to the wearable device 100.

In some implementations, the wearable device 100 may comprise one or more sensors 160. The one or more sensors 160 may be configured to sense one or more environmental conditions in an environment related to the wearable device 100. For example, one or more sensors 160 may be configured to sense temperature, humidity, sound, light, magnetic fields, gravity, the presence of one or more chemicals, air quality, and/or other environmental conditions.

In some implementations, the processor 110 may be configured to execute one or more modules, including, for example, an event handler module 111, a control signal generation module 112, a feedback control module 113, a communication module 114, an object recognition module 115, and/or other computer program modules. The event handler module 111 may be configured to detect whether an event occurs in the environment related to the wearable device 100. The control signal generation module 112 may be configured to receive information relating to an event and generate a control signal. The control signal may be representative of an event occurring in an environment related to the wearable device 100. The feedback control module 111 may be configured to receive a control signal and cause the feedback component 130 to provide the feedback. The communication module 112 may be configured to facilitate communication between the wearable device 100 and another device.

In some implementations, the event handler module 111 may be configured to detect whether an event occurs in the AR environment. The event handler module 111 may receive data from the imaging component 150, the object recognition module 115, the input component 120, the communication port 140, the storage 170, and/or other modules or components of the wearable device 100.

In some implementations, the event handler module 111 may receive visual data from the imaging component 150, information relating to captured objects in the visual data from the object recognition module 115, information received via the input component 120, information from another computing device received via a communication channel 300, and/or other information of the environment related to the wearable device. The event handler module 111 may compare the received information to data related to events stored in the storage 170 to determine whether the information (or a portion of the information) is associated with an event. When some or all of the received information is associated with an event, the event handler module 111 may transmit event data including the received information and data relating to the associated event to the control signal generation module 112.

In some implementations, the event handler module 111 may receive data from the processor 110 indicating that an interaction occurred between the wearable device 100 and one or more objects in the environment related to the wearable device 100, a condition in the environment related to the wearable device 100 changed, input was received at the wearable device 100, input received from another device was processed by the wearable device 100, an interaction occurred between a user and the environment related to the wearable device 100, and/or other processing was performed by the wearable device 100. In some implementations, the event handler module 111 may compare the data received from the processor 110 with data stored in the storage 170 to determine whether the data is associated with an event. When some or all of received information is associated with an event stored in the storage 170, the event handler module 111 may transmit event data including the received information and data relating to the associated event to the control signal generation module 112.

In some implementations, when the received information is not associated with an event stored in the storage 170, the event handler module 111 may transmit event data including the received information to the server 400 such that the server 400 can perform event handling. When some or all of received information is associated with an event stored in a storage of the server 400, the server 400 may communicate information relating to the associated event to the event handler module 111. The event handler module 111 may transmit event data including the received information and data relating to the associated event to the control signal generation module 112. When the received information is not associated with an event stored in the storage of the server 400, the server 400 may communicate an indication that no match was found.

In some implementations, the control signal generation module 112 may be configured to receive the event data from the event handler module 111 and generate a control signal based on the event data. The storage 170 of the wearable device 100 may include a lookup table that associates a plurality of events and a respective plurality of control signals. Based on the event data received from the event handler module 111, the control signal generation module 112 may generate a control signal. For example, the control signal generation module 112 may compare the received event data to the data stored at the storage 170. When some or all of the event data matches an event 170 stored in the storage, the control signal generation module 112 may generate a control signal related to the control signal associated with the matched event. When the event data does not match an event stored in the storage 170, the control signal generation module 112 may communicate the event data to the server 400 to determine whether a storage of the server 400 has stored a control signal associated with some or all of the event data. The control signal may comprise, for example, information indicating that an event occurred, information indicating that a specific type of event occurred, information relating to one or more objects of the event, information related to one or more environmental conditions of the event, information relating to one or more interactions of the event, information relating to a timing of the event, information related to a date of the event, information relating to a duration of the event, information relating to a frequency of a type of event, information relating to a frequency of the event detected, and/or other information relating to an event.

The feedback control module 113 may be configured to receive a control signal (e.g., from the control signal generation module 112) and cause the feedback component 130 to provide feedback via the wearable device 100. The control signal may be representative of an event that occurs in an environment related to a wearable device 100. The event may include, for example, an indication of a physical object within a predetermined proximity of the wearable device 100, an indication of an environmental condition occurring in the environment, an indication of a change in an environmental condition occurring in the environment, an indication of a movement of an object within a predetermined proximity of the wearable device 100, an interaction between the wearable device 100 and an object in the environment, an indication that the wearable device 100 recognizes an object in the environment, a navigation event, and/or another event occurring in an environment related to the wearable device 100. In some implementations, the feedback control module 113 may be configured to provide the control signal to the feedback component 130. In this implementation, the control signal may be directly applied to the feedback component 130 to cause the feedback. In some implementations, the feedback control module 113 may be configured to determine a feedback response based on the received control signal. In these implementations, the feedback control module 113 may consult a lookup table to determine the feedback response based on the received control signal. The feedback response may comprise one or more types of feedback and one or more feedback signals of the indicated feedback types to be generated based on the received control signal. The feedback control module 113 may be configured to generate the indicated feedback signals of the feedback response and transmit the feedback signals to the respective feedback components 130 to which the signals correspond.

In some implementations, the feedback control module 113 may consult a lookup table of the wearable device 100 to determine which types of feedback and which feedback signals to include in the feedback response based on the received control signal.

The feedback response may include a single feedback signal, a plurality of feedback signals for a single feedback component 130, a plurality of feedback signals for a plurality of feedback components 130, a pattern of feedback signals for one or more feedback components 130, and/or other types of feedback response. In some implementations, a plurality of feedback components 130 may provide a feedback response at a same time. In some implementations, one or more feedback components 130 may provide a first feedback response at a first time and one or more feedback components 130 may provide a second feedback response at a second time subsequent to the first time.

In some implementations, the type of feedback response may indicate the type of event represented by the control signal. For example, a feedback response comprising a single signal may indicate that the event represents the recognition of an object in the environment related to the wearable device 100. A feedback response comprising a pattern of signals may indicate that the event represents an interaction between the wearable device 100 and an object in the environment related to the wearable device 100. The indications associated with the different types of feedback responses are not limited to the described examples.

In some implementations, the lookup table may store associations between a plurality of control signals and a plurality of feedback responses. For example, when a control signal comprises information indicating that an event occurred, the lookup table may store a feedback response associated with that control signal. When a control signal comprises information indicating that a type of event occurred, the lookup table may store one or more different feedback responses for one or more types of event that may be indicated by the information of the control signal. When a control signal comprises information indicating an interaction between the wearable device 100 and one or more objects in an environment related to the wearable device 100, the lookup table may store a different feedback response for different interactions that may occur between the wearable device 100 and one or more objects in the environment related to the wearable device 100. In some implementations, the feedback control module 113 may retrieve a feedback response from a server 400 that is configured to store a lookup table comprising a plurality of control signals and associated feedback responses.

The communication module 114 may be configured to facilitate communication between the wearable device 100 and another device such as, for example, a server 400, and/or other devices that may be in communication with the wearable device 100. The communication module 114 may be configured to provide a wired or wireless communication channel 300 for communication between the wearable device 100, the server 400, and/or another device. In some implementations, the processor 110 may be configured to receive a signal representative of an event occurring at the wearable device 100 via a wireless or wired communication channel 300 of the communication module 114.

In some implementations, the object recognition module 115 may be configured to recognize objects in a physical space. The object recognition module 115 may communicate with the imaging component 150 and the storage 170 of the wearable device 100 to recognize an object in the physical space. For example, the object recognition module 115 may receive visual data captured from the imaging component 150 and may process the visual data to determine whether one or more objects exist in the captured visual data. The object recognition module 115 may compare the captured objects that exist in the visual data with objects stored in the storage 170.

For example, the object recognition module 115 may compare the pixels of a captured object with the pixels of a stored object in the storage 170 according to known techniques. When a threshold percentage of pixels (e.g., 80%, 90%, 100%, and/or other percentages) of the captured object match the pixels of a stored object, the object recognition module 115 may determine that the captured object has been recognized as the stored object. In some implementations, the threshold percentage may depend upon a resolution of the imaging component 150.

The object recognition module 115 may obtain information relating to the stored object and transmit the information relating to the stored object and the information relating to the captured object to the event handler module 111. The information transmitted to the event handler module 111 may include, for example, image data for the stored object, a type of the stored object, the location of the captured object in the physical space, a proximity of the captured object to other physical objects, context information relating to the stored object, context information relating to the captured object, and/or other data associated with the stored object or the captured object. In some implementations, the object recognition module 115 may transmit the information relating to the stored object and the information relating to the captured object to one or more of the event handler module 111, the control signal generation module 112, the feedback control module 113, and/or other modules of the processor 110.

In some implementations, when the captured object does not match a stored object, the object recognition module 115 may transmit data relating to the captured object to the server 400 such that the server 400 can perform object recognition. When the server 400 recognizes the captured object, the server 400 may communicate information relating to a stored object that matches the captured object to the object recognition module 115. The object recognition module 115 may transmit the information relating to the stored object from the server 400 and the information relating to the captured object to the event handler module 111. When the server 400 does not recognize the captured object, the server 400 may communicate an indication that no match was found.

The input component 120 may be configured to receive an input such as, for example, a button press, a gesture, voice command, and/or other input. The input may be communicated, by the processor 110, to another device such as, for example, server 400 and/or another device in communication with the wearable device 100, via the communication channel 300. For example, the input component 120 may include a touch pad, a touch screen, a mechanical button, a switch, an audio receiver, such as a microphone, and/or another input component that can receive an input.

The feedback component 130 may comprise one or more haptic output devices configured to provide haptic feedback, one or more visual devices configured to provide a visual feedback, one or more audio devices configured to provide an audible feedback, and/or another device that produces feedback. A haptic output device may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers, or shape memory alloys, a macro-composite fiber actuator, an electro-static actuator, an electro-tactile actuator, and/or another type of actuator that provides a physical feedback such as a haptic (e.g., vibrotactile) feedback. The haptic output device may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. A visual device may be configured to generate a visual feedback such as visible light at the wearable device 100. For example, the visual feedback may visually indicate the occurrence of an event in an environment related to the wearable device. An audio device may be configured to generate audio feedback such as one or more sounds at the wearable device 100. For example, the audio feedback may audibly indicate the occurrence of an event in an environment related to the wearable device.

The feedback component 130 may be configured to receive one or more signals (e.g., one or more control signals or one or more feedback signals) from the feedback control module 113. Based on the one or more signals, one or more haptic output devices, one or more visual devices, one or more audio devices, and/or other feedback components 130 may provide feedback via the wearable device 100.

The communication port 140 may include an interface through which a communication channel 300 may be maintained with another device such as, for example, a server 400, and/or other devices that may be in communication with the wearable device 100. In some implementations, a control signal may be received via the communication channel 300, which may include a wired or a wireless communication channel.

In some implementations, the processor 110 may be configured to receive a signal from another computing device. For example, the processor 110 may be configured to receive a signal from another computing device via a communication channel 300 established by the communication port 140. The signal may be representative of an event occurring at the computing device. For example, the signal may comprise information relating to a communication received at the computing device. In another example, the signal may comprise sensory information. In some implementations, the event handler 111 of the processor may receive the signal from the computing device and may detect an event based on the signal. The event may be, for example, an indication of a communication at the computing device (e.g., a communication received at the computing device, a communication sent by the computing device, a communication generated by the computing device, and/or other communication), an indication of processing that occurred at the computing device, an interaction between the computing device and another device, and/or another event occurring at the computing device. In another example, based on the sensory information received in the signal, the event may comprise an indication of one or more environmental conditions in an environment related to the computing device, an indication of one or more environmental conditions in an environment separate from the computing device, an indication of one or more environmental conditions that may occur in the future in the environment related to the wearable device 100, and/or another event based on the sensory information. The event handler module 111 may send information relating to the event to the control signal generation module 112. The control signal generation module 112 may generate a control signal representative of the event. The feedback control module 113 may receive the control signal and may cause the feedback components to produce feedback based on the control signal.

The processor 110 may be configured to receive input via the input component 120. The input received via the input component 120 may comprise, for example, a button press, a gesture, voice command, and/or other input. The processor 110 of the wearable device 100 may process the received data and perform functionality based on the processing. In some implementations, based on the input received via the input component 120, an event may be detected by the wearable device 100. In these implementations, feedback may be provided via the wearable device 100 based on the event detected from the received input.

In some implementations, the processor 110 may perform functionality that is detected as an event by the wearable device 100. For example, the processor 110 may perform functionality related to a navigation event. For example, the processor may perform functionality to obtain map information for a user of the wearable device 100. The map information may comprise, for example, a set of directions for a user of the wearable device 100 to follow. In some implementations, one or more of the directions may be detected as one or more navigation events by the event handler module 111 of the processor 110. Based on the one or more directions of the map information, the wearable device 100 may be configured to provide feedback via the wearable device 100 indicating the one or more directions. For example, a first haptic feedback via a first haptic output device of the feedback component 130 may be provided to indicate a first direction associated with the navigation event, and a second haptic feedback via a second haptic output device of the feedback component 130 may be provided to indicate a second direction different from the first direction. In another example, the first haptic feedback via the first haptic output device may be provided to indicate a first direction and the second haptic feedback via the second haptic output device may be provided to indicate the first direction.

In some implementations, the storage 170 of the wearable device 100 may store one or more sensor readings taken at different times from the one or more sensors 160 of the wearable device 100. For example, the storage 170 of the wearable device 100 may store a first sensor reading taken at a first time and a second sensor reading taken at a second time subsequent to the first time. The storage 170 and/or the event handler module 111 may store threshold values relating to one or more types of sensor readings. The event handler module 111 may determine whether an event indicating a change in an environmental condition based on one or more sensor readings has occurred based on a threshold value associated with that environmental condition. For example, the event handler module 111 may indicate that a change in temperature in the environment relating to the wearable device 100 has occurred if a temperature change of over 5 degrees has been sensed within a certain period of time.

Figure 2:
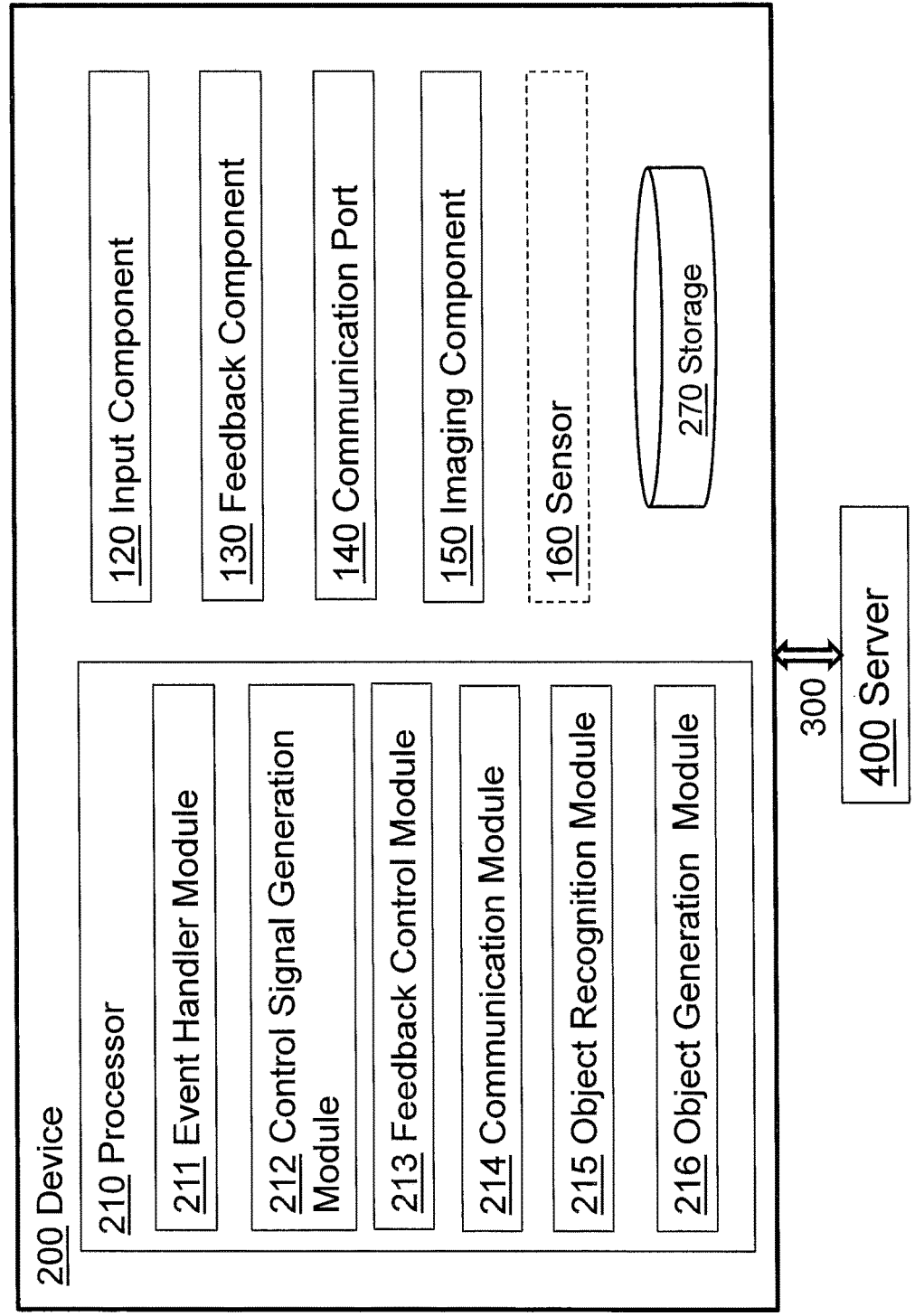
FIG. 2 illustrates a block diagram of an exemplary wearable augmented reality device configured to provide feedback based on an event that occurs in an environment related to the wearable augmented reality device, according to various implementations of the invention.

In some implementations, the wearable device 100 may be configured as a wearable augmented reality ("AR") device 200 as shown in FIG. 2. The wearable device 100 may be configured to generate an augmented reality ("AR") environment comprising both an augmented reality space and a physical space. Wearable AR device 200 may comprise one or more same or similar components and functionality as the wearable device 100. For example, wearable AR device 200 may comprise, for example, a processor 210, an input component 120, a feedback component 130, a communication port 140, an imaging component 150, a storage 270, and/or other components. The processor 210 may be configured to generate the augmented reality space coincident with the physical space. The processor 210 may be configured to recognize at least one physical object in the physical space and augment the at least one physical object with one or more virtual objects in the AR space. The processor 210 may be configured to determine an event within the AR environment and generate a control signal representative of that event. Based on the generated control signal, the processor 210 may cause feedback to be generated at the wearable AR device 200. The input component 120 may be configured to receive an input such as, for example, a button press, a gesture, voice command, and/or other input. The feedback component 130 may be configured to provide feedback via the AR wearable device. The communication port 140 may comprise an interface through which a communication channel may be maintained with, for example, a server 400, and/or other devices. An imaging component 150 may be configured to image the physical space. In some implementations, the imaging component 150 of the wearable AR device 200 may comprise a camera, an infrared detector, and/or another image recording device. The storage 270 of the wearable AR device 200 may store data related to one or more events which the wearable AR device 200 may recognize For example, the storage 270 of the wearable AR device 200 may store data related to events including, for example, an interaction between at least one physical object and the AR environment, a confirmation of an action occurring with respect to the AR environment, an interaction between a physical object and one or more virtual objects displayed in the AR space, a generation of a specific type of virtual object to augment a physical object, a recognition of a physical object, a confirmation that a physical object has been recognized by the wearable AR device 200, an indication of at least one physical object within a predetermined proximity of the wearable AR device 200, an indication of an environmental condition occurring in an environment related to the wearable AR device 200, an indication of a change in an environmental condition occurring in the environment, an indication of a movement of an object within a predetermined proximity of the wearable AR device 200, an interaction between a user and one or more virtual objects displayed in the augmented reality space, and/or another occurrence related to the AR environment.

In some implementations, the wearable AR device 200 may comprise one or more sensors 160. The sensors 160 of the wearable AR device 200 may have the same or similar components and/or functionality as the sensors 160 of the wearable device 100.

In some implementations, the processor 210 of the wearable AR device 200 may comprise same or similar functionality as the processor 110 of the wearable device 100. Additionally, the processor 210 the wearable AR device 200 may have additional functionality. In some implementations, the processor 210 of the wearable AR device 200 may be configured to execute one or more modules, including, for example, an event handler module 211, a control signal generation module 212, a feedback control module 213, a communication module 214, an object recognition module 215, an object generation module 216, and/or other computer program modules. The event handler module 211 may be configured to detect whether an event occurs in the augmented reality environment. The control signal generation module 212 may be configured to receive information relating to an event and generate a control signal related to the event. The feedback control module 213 may be configured to receive a control signal and cause one or more feedback components 130 to provide feedback. The communication module 214 may be configured to facilitate communication between the wearable AR device 200 and other devices such as, for example, a server 400, and/or another device in communication with the wearable AR device 200. The object recognition module 215 may be configured to recognize physical objects in the physical space. The object generation module 216 may be configured to generate virtual objects to augment recognized physical objects.

In some implementations, an event determined by the processor 210 of the wearable AR device 200 may include an interaction between the at least one physical object and the augmented reality environment, a confirmation of an action occurring with respect to the augmented reality environment, a confirmation that the at least one physical object is recognized by the augmented reality device, a confirmation that an object in the physical space has been augmented, an indication of at least one physical object within a predetermined proximity of the wearable AR device 200, an indication of an environmental condition occurring in an environment related to the wearable AR device 200, an indication of a change in an environmental condition occurring in the environment, an indication of a movement of an object within a predetermined proximity of the wearable AR device 200, an interaction between a user and one or more virtual objects displayed in the augmented reality space, and/or another event that occurs in an environment related to the wearable AR device 200.

In some implementations, the event handler module 211 of the wearable AR device 200 may comprise same or similar functionality as the event handler module 111 of the wearable device 100. Additionally, the event handler module 211 of the wearable AR device 200 may have additional functionality. In some implementations, the event handler module 211 may be configured to detect whether an event occurs in the AR environment. The event handler module 211 may receive data from the imaging component 150, the object recognition module 215, the object generation module 216, the storage 270, and/or other modules or components of the wearable AR device 200.

In some implementations, the event handler module 211 may receive visual data from the imaging component 150, information relating to captured objects in the visual data from the object recognition module 215, information relating to virtual objects generated by the object generation module 216, information received via the input component 120, information from another computing device received via a communication channel 300, and/or other information related to the AR environment. The event handler module 211 may compare the received information to data related to events stored in the storage 270 to determine whether the information (or a portion of the information) is associated with an event. When the received information is associated with an event, the event handler module 211 may transmit event data including the received information and data relating to the associated event to the control signal generation module 212. In some implementations, the event handler module 211 may also transmit event data to the object generation module 216.

In some implementations, the event handler module 211 may receive data from the processor 210 indicating that an interaction occurred between the wearable AR device 200 and the AR environment, one or more virtual objects in the AR environment changed, input was received from the wearable AR device 200, input received from the wearable AR device 200 was processed by the wearable AR device 200, an interaction occurred between a user and the AR environment, a condition in an environment relating to the wearable AR device 200 has changed, and/or other processing was performed by the wearable AR device 200. In some implementations, the event handler module 211 may compare the data received from the processor 210 with data stored in the storage 270 to determine whether the data is associated with an event, When some or all of received information is associated with an event stored in the storage 270, the event handler module 211 may transmit event data including the received information and data relating to the associated event to the control signal generation module 212, In some implementations, when the received information is not associated with an event stored in the storage 270, the event handler module 211 may transmit event data including the received information to the server 400 such that the server 400 can perform event handling. When some or all of received information is associated with an event stored in a storage of the server 400, the server 400 may communicate information relating to the associated event to the event handler module 211, The event handler module 211 may transmit event data including the received information and data relating to the associated event to the control signal generation module 212. When the received information is not associated with an event stored in the storage of the server 400, the server 400 may communicate an indication that no match was found.

In some implementations, the control signal generation module 212 may be configured to receive the event data from the event handler module 211 and generate a control signal based on the event data. The storage 270 of the wearable AR device 200 may include a lookup table that associates a plurality of events and a respective plurality of control signals. Based on the event data received from the event handler module 211, the control signal generation module 212 may generate a control signal. For example, the control signal generation module 212 may compare the received event data to the data stored at the storage 270. When some or all of the event data matches an event stored in the storage 270, the control signal generation module 212 may generate a control signal related to the control signal associated with the matched event. When the event data does not match an event stored in the storage 270, the control signal generation module 212 may communicate the event data to the server 400 to determine whether the storage of the server has stored a control signal associated with some or all of the event data, The control signal may comprise, for example, information indicating that an event occurred, information indicating that a specific type of event occurred, information relating to one or more objects of the event, information related to one or more environmental conditions of the event, information relating to one or more interactions of the event, information relating to a timing of the event, information related to a date of the event, information relating to a duration of the event, information relating to a frequency of a type of event, information relating to a frequency of the event detected, and/or other information relating to an event.

The communication module 214 of the wearable AR device 200 may comprise same or similar functionality as the communication module 114 of the wearable device 100.

In some implementations, the object recognition module 215 of the wearable AR device 200 may comprise same or similar functionality as the object recognition module 115 of the wearable device 100. Additionally, the object recognition module 215 of the wearable AR device 200 may have additional functionality. The object recognition module 215 may be configured to recognize objects in a physical space. The object recognition module 215 may communicate with the imaging component 150 and the storage 270 of the wearable AR device 200 to recognize an object in the physical space. For example, the object recognition module 215 may receive visual data captured from the imaging component 150 and may process the visual data to determine whether one or more objects exist in the captured visual data. The object recognition module 215 may compare the captured objects that exist in the visual data with objects stored in the storage 270.

For example, the object recognition module 215 may compare the pixels of a captured object with the pixels of a stored object in the storage 270 according to known techniques. When a threshold percentage of pixels (e.g., 80%, 90%, 100%, and/or other percentages) of the captured object match the pixels of a stored object, the object recognition module 215 may determine that the captured object has been recognized as the stored object. In some implementations, the threshold percentage may depend upon a resolution of the imaging component 150.

The object recognition module 215 may obtain information relating to the stored object and transmit the information relating to the stored object and the information relating to the captured object to the event handler module 211. The information transmitted to the event handler module 21116 may include, for example, image data for the stored object, a type of the stored object, the location of the captured object in the physical space, a proximity of the captured object to other physical objects, context information relating to the stored object, context information relating to the captured object, and/or other data associated with the stored object or the captured object. In some implementations, the object recognition module 215 may transmit the information relating to the stored object and the information relating to the captured object to one or more of the object generation module 216, the control signal generation module 212, and/or other modules of the processor 210.

In some implementations, when the captured object does not match a stored object, the object recognition module 215 may transmit data relating to the captured object to the server 400 such that the server 400 can perform object recognition. When the server 400 recognizes the captured object, the server 400 may communicate information relating to a stored object that matches the captured object to the object recognition module 211. The object may transmit the information relating to the stored object from the server 400 and the information relating to the captured object to the event handler module 211. When the server 400 does not recognize the captured object, the server 400 may communicate an indication that no match was found.

In some implementations, the object generation module 216 may receive information relating to a physical object from the object recognition module 215 and may generate one or more virtual objects to augment the physical object in the AR environment. The object generation module 216 may access the storage 270 to determine whether one or more virtual objects are associated with the physical object. When no virtual objects are associated with the physical object, the object generation module 216 may communicate with the server 400 to determine whether the storage of the server 400 has stored one or more associations between the one or more physical objects and one or more virtual objects. When an association is found in the storage of the server 400, the server 400 may communicate, to the object generation module 216, data related to the associated virtual objects.

When a virtual object is associated with a physical object identified in the information received from the object recognition module 215, the object generation module 216 may generate an AR space coincident with the physical space.

Figure 3:
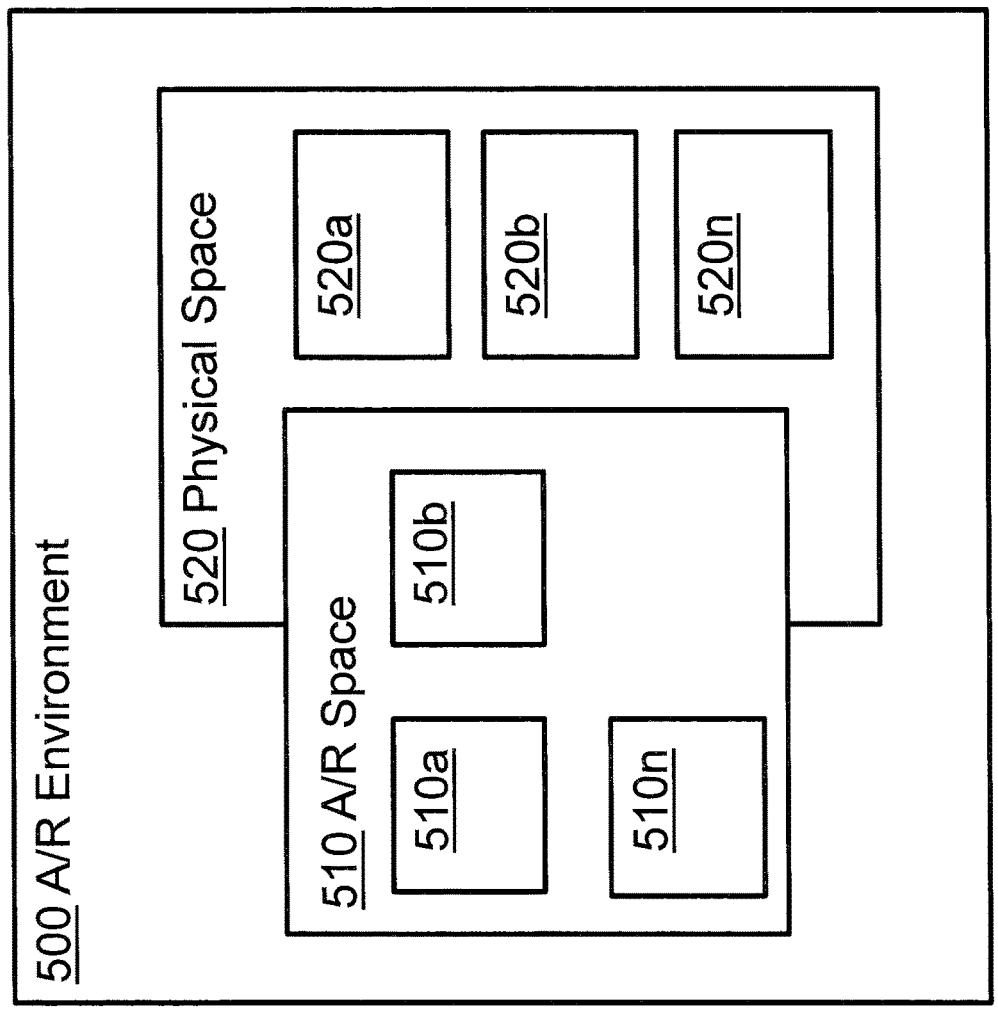
FIG. 3 illustrates a schematic view of an exemplary feedback component, according to various implementations of the invention.

FIG. 3 illustrates a block diagram of an exemplary AR environment 500, The AR environment 500 comprises a physical space 520 comprising one or more physical objects 520a, 520b, . . . , 520n and an AR space 510 comprising one or more virtual objects 510a, 510b, . . . , 510n that augment one or more physical objects 520a, 520b, . . . , 520n in the physical space 520.

In some implementations, the object generation module 216 may augment a physical object 520n with one or more virtual objects 510a, 510b, . . . , 510n in the AR space 510. For example, the object generation module 216 may display the AR space 510 (and one or more virtual objects 510a, 510b, . . . , 510n) via a display surface of the wearable AR device 200. In some implementations, the AR space 510 and one or more virtual objects 510a, 510b, . . . , 510n displayed may be displayed in a three-dimensional manner via the display surface of the wearable AR device 200.

The AR environment 500 displayed via the display of the wearable AR device 200 may include the physical space 520 and the AR space 510. In some implementations, the physical space 520 may be imaged by the imaging component 150 and displayed via the display. In some implementations, the physical space 520 may simply be viewed through the display, such as in implementations where the display is configured as an at least partially transparent display (e.g., a lens) through which the physical space 520 may be viewed. Whichever implementation to display the physical space 520 is used, one or more virtual objects 510a, 510b, . . . 510n may be displayed coincident with or in association with one or more physical objects 520a, 520b, . . . 520n that exist in the physical space 520, thereby augmenting the one or more physical objects 520a, 520b, . . . 520n in the AR environment 500. A single virtual object 510a may augment a single physical object 520a or a plurality of physical objects 520a, 520b, . . . 520n. A plurality of virtual objects 510a, 510b, . . . 510n may augment a single physical object 520a or a plurality of physical objects 520a, 520b, . . . 520n. The number and types of virtual objects 510a, 510b, . . . 510n that augment physical objects 520a, 520b, . . . 520n that exist in the physical space 520 is not limited to the examples described.

Returning to FIG. 2, the processor 210 may be configured to receive input from the wearable AR device 200. For example, the processor 210 may receive data from the wearable AR device 200 related to input that was received via the input component 150. The input received via the input component 150 may comprise, for example, a button press, a gesture, voice command, and/or other input. The processor 210 of the wearable AR device 200 may process the received data and perform functionality based on the processing. For example, the processor 210 may add, delete, change, and/or otherwise modify one or more virtual objects 510a, 510b, . . . , 510n in the AR environment 500. The processor 210 may send data to the wearable device 100 based on the processing. The processor 210 may perform other functionality based on the processing. In some implementations, the processor 210 may receive input from another computing device that includes identifying indicia for the computing device and an indication that the input comprises the identifying indicia. The wearable AR device 200 may store the identifying indicia and associate the identifying indicia with the computing device.

Figure 4:
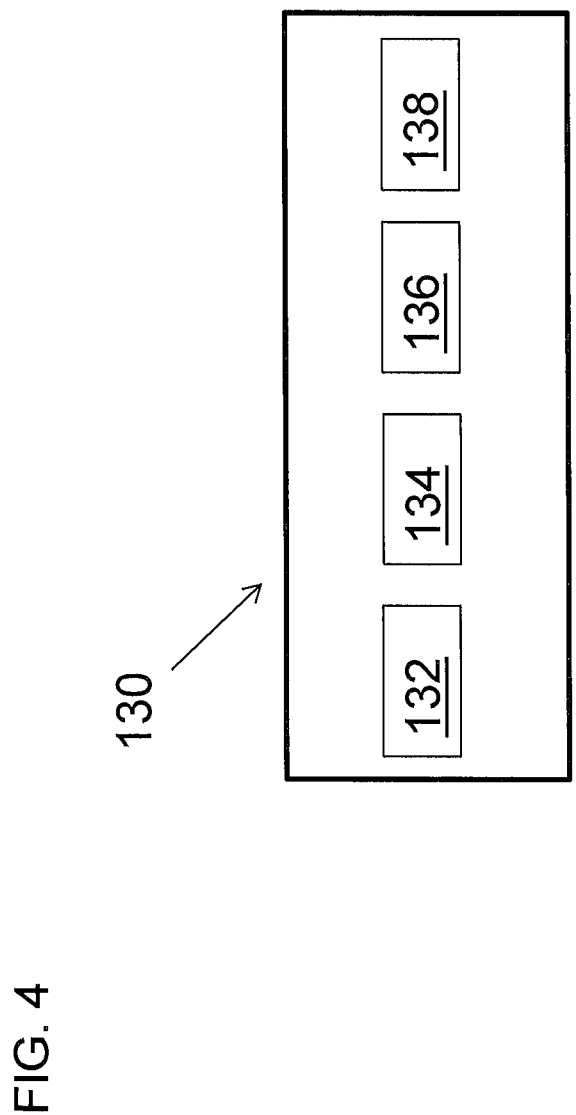
FIG. 4 illustrates a depiction of an exemplary augmented reality environment, according to various implementations of the invention.

As shown in FIG. 4, the feedback component 130 of the wearable device 100 (or the wearable AR device 200) may comprise one or more devices. In some implementations, the one or more devices may be spaced apart at the wearable device 100 (or the wearable AR device 200). The feedback component 130 may comprise, for example, one or more haptic output devices 132 configured to provide haptic feedback, one or more visual devices 134 configured to provide a visual feedback, one or more audio devices 136 configured to provide an audible feedback, a light-emitting band 138, and/or another device that produces feedback.

The haptic output device 132 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers, or shape memory alloys, a macro-composite fiber actuator, an electro-static actuator, an electro-tactile actuator, and/or another type of actuator that provides a physical feedback such as a haptic (e.g., vibrotactile) feedback. The haptic output device 132 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In some implementations, one or more haptic output devices 132 may be spaced apart throughout the wearable device 100 (or the wearable AR device 200).

The visual device 134 may be configured to generate a visual feedback such as visible light at the wearable device 100. For example, the visual feedback may visually indicate the occurrence of an event detected by the wearable device 100 (or the wearable AR device 200).

The audio device 136 may be configured to generate audio feedback such as one or more sounds at the wearable device 100. For example, the audio feedback may audibly indicate the occurrence of an event detected by the wearable device 100 (or the wearable AR device 200).

The light-emitting band 138 may be configured to generate a light-emitting band emanating from and/or around the wearable device 100 (or the wearable AR device 200). The light emitted via the band 138 may include a color, a pattern, and/or other visual characteristics. The visual characteristics may coordinate with one or more events detected by the wearable device 100 (or the wearable AR device 200).

Figure 5:
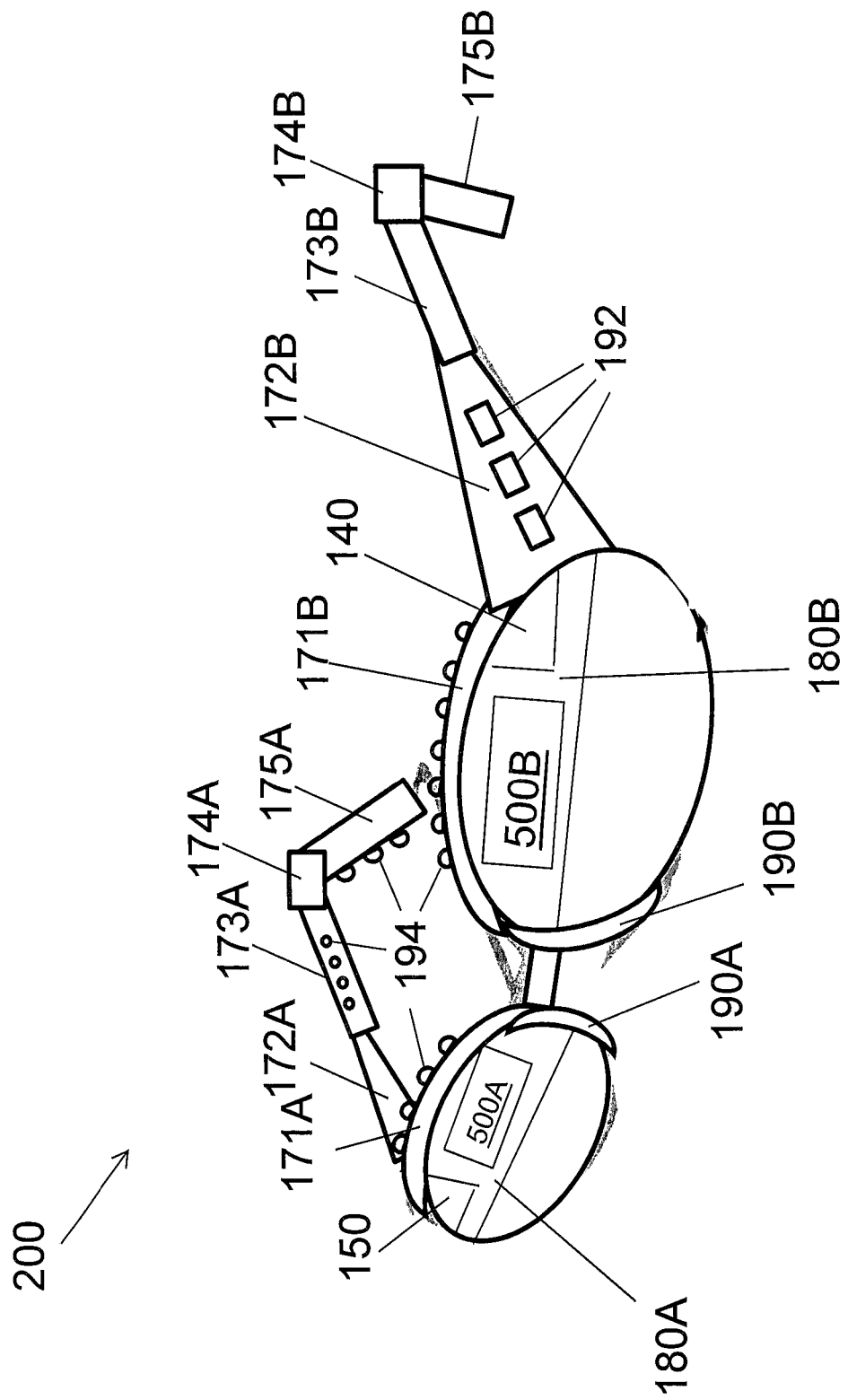
FIG. 5 illustrates a schematic view of an exemplary wearable augmented reality device configured as eyewear, according to various implementations of the invention.

As shown in FIG. 5, in some implementations, the wearable AR device 200 may be configured in the shape of eyewear. For example, the wearable AR device 200 may be configured to display the AR environment 500 (or AR environments 500A, 500B) via one or both lenses 180A and 180B of the eyewear. In some implementations, a part of lens 180A may be configured to display an AR environment 500A and a part of lens 180B may be configured to display AR environment 500B. AR environment 500A and AR environment 500B may be separate AR environments, may be overlapping AR environments, may be displayed via two separate lenses as a single AR environment 500, and/or may comprise one or more AR environments to be displayed in other ways.

The eyewear may comprise one or more components, including, for example, a frame, a first lens 180A connected to a first portion of the frame, a second lens 180B connected to a second portion of the frame, a first nose pad 190A connected to the frame adjacent the first lens 180A, a second nose pad 190B connected to the frame adjacent the second lens 180B, and/or other eyewear components. The frame may comprise, for example, a first top portion 171A of the frame at a first end of the frame, a second top portion 171B of the frame at a second end opposite the first end of the frame, a first temple 172A connected to the first top portion 171A and extending in a direction perpendicular to the first top portion 171A, a second temple 172B connected to the second top portion 171B and extending in a direction perpendicular to the second top portion 171B and parallel to the first temple 172A, and/or other components. The first temple 172A may comprise one or more portions including, for example, a first portion 173A, a second portion 174A, a third portion 175A, and/or other portions. The second temple 172B may comprise one or more portions including, for example, a first portion 173B, a second portion 174B, a third portion 175B, and/or other portions.

Components of the wearable AR device 200 (e.g., the imaging component 150, wireless transceiver 140, processor, etc.) may be disposed at various locations of the eyewear. The following are merely for illustrative purposes and are non-limiting examples. A portion of the frame near one of the lenses 180A (or a portion of the lens 180A) may comprise the imaging component 150. A portion of the frame near the other lens 180B (or a portion of the other lens 180B) may comprise a wireless transceiver 140 that may comprise a communication port. One or both of the first top portion 171A and/or the second top portion 171B may comprise the processor, the communication port, and/or other components of the wearable AR device 200. In some implementations, one or both of the first temple 172A and/or the second temple 172B may comprise one or more of the processor, the communication port, and/or other components of the wearable AR device 200.

In some implementations, the first top portion 171A of the frame may comprise one or more haptic output devices of the feedback component 130 positioned at one or more respective positions of the first top portion 171A of the frame. The second top portion 171B of the frame may comprise one or more haptic output devices of the feedback component 130 positioned at one or more respective positions of the second top portion 171B of the frame. In some implementations, the first temple 172A may comprise one or more haptic output devices positioned at one or more respective portions of the first temple 172A. The second temple 172B may comprise one or more haptic output devices positioned at one or more respective portions of the second temple 172B.

In some implementations, the first temple 172A may comprise a deformable material. In some of these implementations, the first temple 172A may be configured to bend laterally inward. In some of these implementations, a first portion 173A of the first temple 172A may be configured to bend laterally inward and a second portion 174A of the first temple 172A adjacent the first portion may be configured to bend laterally inward or laterally outward. A third portion 175A may be configured to bend laterally inward and laterally outward, vibrate, provide feedback that provides a tickling sensation to a wearer of the eyewear, and/or provide other types of feedback. In some implementations, one or more of the first portion 173A, second portion 174A, third portion 175A, and/or other portions of the first temple 172A may comprise one or more haptic output devices that may be configured to provide a vibration effect, provide a tickling sensation, comprise a deformable material configured to bend laterally inward, comprise a deformable material configured to bend laterally inward and laterally outward, and/or provide other types of haptic feedback.

In some implementations, the second temple 172B may comprise a deformable material. In some of these implementations, the second temple 172B may be configured to bend laterally inward. In some of these implementations, a first portion 173B of the second temple 172B may be configured to bend laterally inward and a second portion 174B of the second temple 172B adjacent the first portion may be configured to bend laterally inward or laterally outward. A third portion 175B may be configured to bend laterally inward and laterally outward, vibrate, provide feedback that provides a tickling sensation to a wearer of the eyewear, and/or provide other types of feedback. In some implementations, one or more of the first portion 173B, second portion 174B, third portion 175B, and/or other portions of the second temple 172B may comprise one or more haptic output devices that may be configured to provide a vibration effect, provide a tickling sensation, comprise a deformable material configured to bend laterally inward, comprise a deformable material configured to bend laterally inward and laterally outward, and/or provide other types of haptic feedback. The various portions of first temple 172A and second temple 172B may provide one or more types of feedback disposed at one or more positions at first temple 172A and/or second temple 172B.

In some implementations, the first nose pad 190A may comprise a deformable material. The first nose pad 190A may be configured to bend laterally inward. In some implementations, one or both of first nose pad 190A or second nose pad 190B may comprise one or more haptic output devices. In some implementations, the deformable material of the first temple 172A, the second temple 172B, the first nose pad 190A, the second nose pad 190B, and/or other components that comprise deformable material may provide feedback as one or more feedback components 130 of the wearable AR device 200 configured as eyewear.

Other configurations of the eyewear may be used as well. For example, in some implementations, one or more portions of the eyewear may be configured to provide one or more of the following haptic sensations: the eyewear squeezing the head of a user, the eyewear squeezing the ear of the user, the eyewear squeezing the nose of the user, the eyewear having a vibrating array of elements 192 felt by the user, the eyewear moving against the ear of the user, protrusions 194 extending from the eyewear and contacting the user, sensations indicating flow or saltation along the eyewear by using, for example, the array of elements 192, changing the surface feel of the frame to the user, and deforming any part of the frame. By providing a more advanced functionality to the eyewear, more complex haptic information may be communicated to the user in order to provide, for example, gaming information, status information, direction information and/or object interaction information.

The haptic functionality described above may be provided by known actuation technologies, including but not limited to actuators that include piezoelectric materials, smart gels, shape memory alloys, electroactive polymers, electromagnetics, fluid reservoirs, etc. For example the "squeeze ear" modality may be created with a shape memory fiber embedded in the eyewear frame. When actuated, the fiber may shrink and pull the frame so as to slightly reduce the radius of the ear piece applying pressure to the user's ear and convey a haptic effect to the user's ear.

In some implementations, the eyewear may include at least one touch sensitive surface implemented directly into the eyewear frame. In some implementations, electrostatic friction type displays may be used to change the surface feel of the eyewear frame in order to indicate an active function or confirmation, for example. In some implementations, the array of elements 192 may be an array of touch sensitive surfaces, such as touchpads.

Each of the haptic modalities described above may have many specific application examples. For example, haptic effects associated with the "squeeze ear" modality may be used to notify the user, to provide confirmation to the user of an action, to indicate status of an event or to provide directional information such as which direction to focus attention. The unique location of the haptic effect may provide additional information. For example, haptic effects on the nose may be used to indicate interaction with virtual objects the user is facing, while haptic effects to the right and lefts sides of the head along the temples of the eyewear, or behind the ears, may be used for interaction with objects to the right and left sides of the user, respectively.

In some implementations, the wearable device 100 may be configured in the shape of eyewear. The eyewear comprising the wearable device 100 may have one or more same or similar components and functionality as the wearable AR device 200 configured as eyewear. In some implementations, the wearable device 100 configured as eyewear may not display the AR environment 500 via one or both lenses 180A, 180B or via the frame of the eyewear.

In some implementations, the wearable device 100 may be configured as headwear, for example, a visor, goggles, a face mask, a ski mask, laboratory glasses, safety glasses, a hat, a baseball cap, a bandana, a headband, earmuffs, hair comb, hair chain, and/or other accessories worn around a user's head. In some implementations, the wearable AR device 200 may be configured as headwear, for example, a visor, goggles, a face mask, a ski mask, laboratory glasses, safety glasses, a hat, a baseball cap, a bandana, a headband, earmuffs, a necklace, earrings, hair comb, hair chain, and/or other accessories worn around a user's head.

Referring back to FIGS. 1 and 2, in some implementations, the server 400 may be configured to communicate with one or more of the wearable device 100, the wearable AR device 200, and/or other devices in communication with the server 400. In some implementations, server 400 may comprise a processor, a storage, and a communication port.

The processor of the server 400 may be configured to receive data, recognize objects, handle events, send data, and/or provide other functionality. In some implementations, the server 400 may be configured to receive, from the processor 110 of the wearable device 100, a control signal. The storage of the server 400 may comprise a lookup table that may be configured in a manner similar or the same as the lookup table of the wearable device 100 that comprises a plurality of control signals and a plurality of feedback responses. When the lookup table includes an entry relating to the control signal, the server 400 may communicate to the control signal generation module 112 information relating to the control signal found in the lookup table. When the lookup table of the server 400 does not include an entry relating to the control signal, the server 400 may communicate an indication that no match was found for the control signal to the feedback control module 111. In some implementations, the server 400 may perform image processing and/or object recognition relating to data received from the wearable device 100.

In some implementations, the server 400 may be configured to receive event data from the event handler module 111 of the processor 110 of the wearable device 100. The storage of the server 400 may include a lookup table that associates a plurality of events and a respective plurality of control signals. When some or all of the event data matches an event stored in the storage of the server 400, the processor of the server 400 may communicate the event data related to the event to the event handler module 111. When the event data does not match an event stored in the storage, the processor of the server 400 may communicate that no match was found to the wearable device 100.

In some implementations, the server 400 may receive data related to an object captured by the imaging component 150 of the wearable device 100. The processor of the server 400 may perform object recognition related to the captured object. The storage of the server 400 may comprise a lookup table that comprises one or more physical objects. The server 400 may determine whether the lookup table comprises an entry related to the object recognized from the received data. When the lookup table comprises an entry related to the recognized object, the server 400 may communicate information relating to a stored object that matches the recognized object to the object recognition module 115. When the server 400 does not recognize the recognized object, the server 400 may communicate an indication that no match was found to the object recognition module 115.

In some implementations, the server 400 may receive data related to a physical object recognized by the object recognition module 215 of the processor 210 of the wearable AR device 200. The processor of the server 400 may determine whether the storage of the server 400 has stored an association between the physical object and one or more virtual objects. In some implementations, the storage of the server 400 may comprise a lookup table that comprises physical objects, virtual objects, and one or more correlations between one or more physical object and one or more virtual objects. When an association is found in the storage of the server 400, the server 400 may communicate, to the object generation module 216, data related to the associated virtual objects. When no association is found in the storage of the server 400, the server 400 may communicate that no association has been found.

The communication port of the server 400 may include an interface through which a communication channel 300 may be maintained with, for example, the wearable device 100, the wearable AR device 200, and/or another device in communication with the server 400. Data and/or signals may be received via the communication channel 300, and/or another communication channel through which the server 400 receives data and/or signals.

Figure 6:
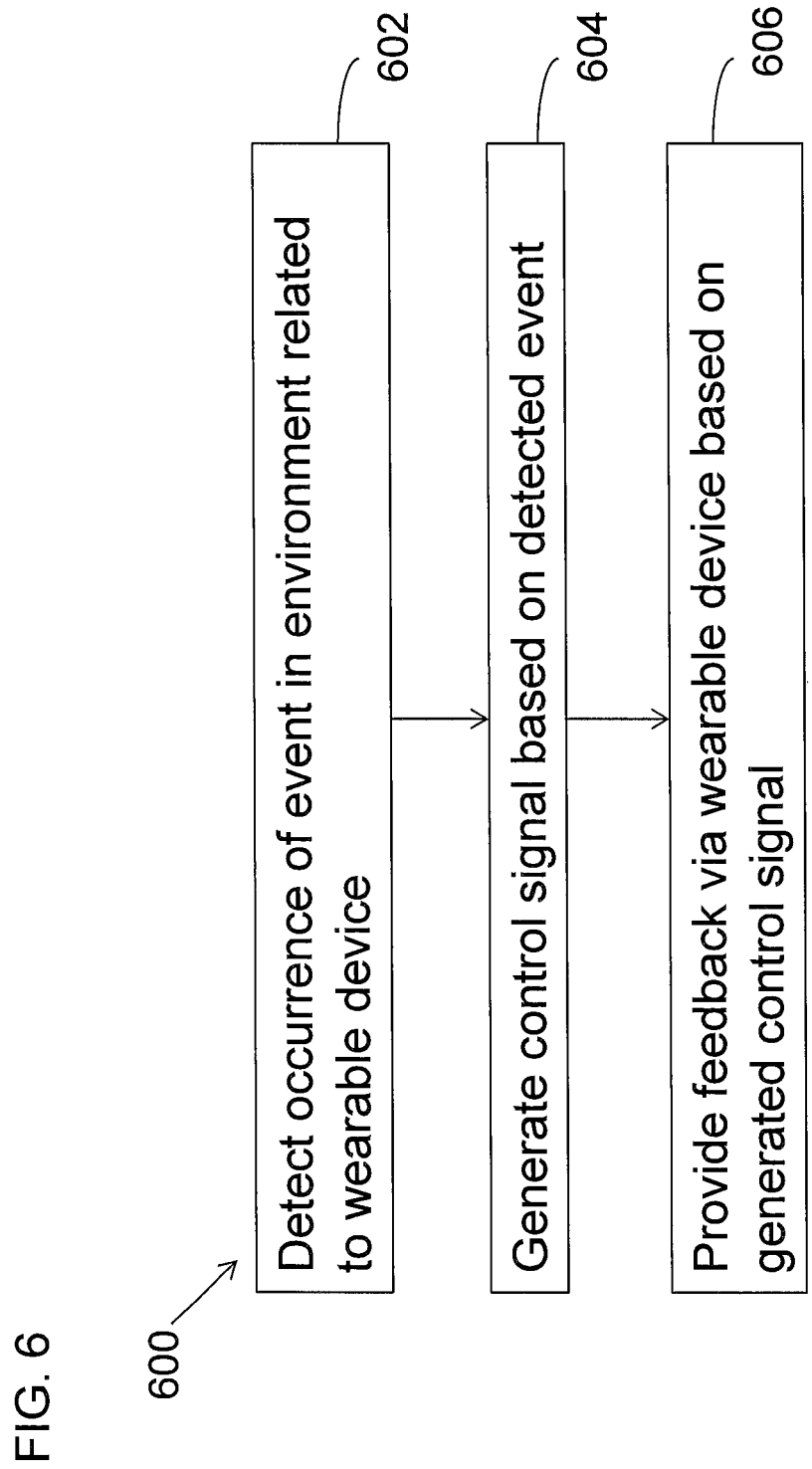
FIG. 6 illustrates a flowchart of an exemplary process of providing feedback based on an event that occurs in an environment related to the wearable device, according to various implementations of the invention.

FIG. 6 illustrates a flowchart of an exemplary method 600 of providing feedback based on an event occurring in an environment related to the wearable device 100, according to an implementation of the invention. The described operations of FIG. 6 and other Figures may be accomplished using some or all of the system components described in detail above and, in some implementations, various operations may be performed in different sequences. In other implementations, additional operations may be performed along with some or all of the operations shown in FIG. 6 and the other Figures. In yet other implementations, one or more operations may be performed simultaneously. In yet other implementations, one or more combinations of various operations may be performed. Some implementations may not perform all of the operations described with relation to FIG. 6 and other Figures. Accordingly, the operations described are exemplary in nature and, as such, should not be viewed as limiting.

In some implementations, the operations of FIG. 6 and other Figures may be implemented in one or more processing devices (e.g., wearable device 100, wearable AR device 200, server 400, and/or other devices). The one or more processing devices may include one or more devices executing some or all of the operations of FIG. 6 and other Figures in response to instructions stored electronically on an electronic storage medium. The one or more processing devices may include one or more devices configured through hardware, firmware, and/or software to be specifically designed for execution of one or more of the operations of FIG. 6 and other Figures.

In an operation 602, an occurrence of an event may be detected in an environment related to the wearable device 100. The event handler module 111 may be configured to determine whether an event occurred in an environment related to the wearable device 100 based on information received from one or more of the processor 110 or the imaging component 150. The event may include an indication of a physical object within a predetermined proximity of the wearable device 100, an indication of an environmental condition occurring in the environment, an indication of a change in an environmental condition occurring in the environment, an indication of a movement of an object within a predetermined proximity of the wearable device 100, an interaction between the wearable device 100 and an object in the environment, an indication that the wearable device 100 recognizes an object in the environment, a navigation event, and/or another event occurring in an environment related to the wearable device 100. In some implementations, when an occurrence of an event is detected in an environment related to the wearable AR device 200, the event may include an interaction between the at least one physical object and the augmented reality environment, a confirmation of an action occurring with respect to the augmented reality environment, a confirmation that the at least one physical object is recognized by the augmented reality device, a confirmation that an object in the physical space has been augmented, an indication of at least one physical object within a predetermined proximity of the wearable AR device 200, an indication of an environmental condition occurring in an environment related to the wearable AR device 200, an indication of a change in an environmental condition occurring in the environment, an indication of a movement of an object within a predetermined proximity of the wearable AR device 200, an interaction with one or more virtual objects displayed in the augmented reality space, and/or another event that occurs in an environment related to the wearable AR device 200. An interaction with one or more virtual objects may comprise a manipulation of one or more virtual objects, an interaction between a user and one or more virtual objects displayed in the augmented reality space, an interaction between one or more physical objects in the physical space and the one or more virtual objects, and/or another event relating to a virtual object in the environment related to the wearable AR device 200.

In an operation 604, wearable device 100 may generate a control signal based on the detected event. For example, when the event handler module 111 of the wearable device 100 detects an event, the control signal generation module 112 may be configured to determine a control signal associated with the detected event. In some implementations, when an occurrence of an event is detected in an environment related to the wearable AR device 200, the event handler module 211 of the wearable device 100 detects an event, the control signal generation module 212 may be configured to determine a control signal associated with the detected event.

In an operation 606, the feedback control module 113 of the processor 110 may receive the control signal. Feedback may be provided via the wearable device 100. The feedback control module 113 may cause the feedback component 130 to provide feedback via the wearable device 100. In some implementations, the feedback control module 113 may be configured to provide the control signal to the feedback component 130. In these implementations, the control signal may be directly applied to the one or more feedback components 130 to cause the feedback. In some implementations, the feedback control module 113 may be configured to determine a feedback response based on the received control signal. The feedback control module 113 may provide a feedback response comprising one or more types of feedback and one or more feedback signals of the indicated feedback types to be generated. The feedback control module 113 may be configured to generate the indicated feedback signals of the feedback response and transmit the feedback signals to the respective feedback components 130 to which the signals correspond.

One or more feedback components 130 of the wearable device 100 may provide feedback via the wearable device 100. In some implementations, the feedback provided may be based on one or more feedback signals received from the feedback control module 113. The feedback may correspond to the event detected within the environment related to the wearable device. For example, the feedback may be representative of the event.

In some implementations, when an occurrence of an event is detected in an environment related to the wearable AR device 200, the feedback control module 213 of the processor 210 may receive the control signal. Feedback may be provided via the wearable AR device 200. The feedback control module 213 may cause the feedback component 120 to provide feedback via the wearable AR device 200. In some implementations, the feedback control module 213 may be configured to provide the control signal to the feedback component 130. In these implementations, the control signal may be directly applied to the one or more feedback components 130 to cause the feedback. In some implementations, the feedback control module 213 may be configured to determine a feedback response based on the received control signal. The feedback control module 213 may provide a feedback response comprising one or more types of feedback and one or more feedback signals of the indicated feedback types to be generated. The feedback control module 213 may be configured to generate the indicated feedback signals of the feedback response and transmit the feedback signals to the respective feedback components 130 to which the signals correspond.

One or more feedback components 130 of the wearable AR device 200 may provide feedback via the wearable AR device 200. In some implementations, the feedback provided may be based on one or more feedback signals received from the feedback control module 213. The feedback may correspond to the event detected within the environment related to the wearable device. For example, the feedback may be representative of the event.

Wearable device 100 may include storage 170, one or more processors 110, and/or other components. Wearable device 100 may include communication lines, or ports to enable the exchange of information with a network and/or other computing platforms. Illustration of wearable device 100 in FIG. 1 is not intended to be limiting. Wearable device 100 may include a plurality of hardware, software, and/or firmware components operating together to provide the functionality attributed herein to wearable device 100.

Storage 170 may comprise non-transitory storage media that electronically stores information. The electronic storage media of storage 170 may include one or both of system storage that is provided integrally (i.e., substantially non-removable) with wearable device 100 and/or removable storage that is removably connectable to wearable device 100 via, for example, a port (e.g., a USB port, a firewire port, etc.) or a drive (e.g., a disk drive, etc.). Storage 170 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Storage 170 may include one or more virtual storage resources (e.g., cloud storage, a virtual private network, and/or other virtual storage resources). Storage 170 may store software algorithms, information determined by processor 110, information received from wearable device 100, and/or other information that enables wearable device 100 to function as described herein.

Processor(s) 110 is configured to provide information processing capabilities in wearable device 100. As such, processor 110 may include one or more of a digital processor, an analog processor, a digital circuit designed to process information, an analog circuit designed to process information, a state machine, and/or other mechanisms for electronically processing information. Although processor 110 is shown in FIG. 1 as a single entity, this is for illustrative purposes only. In some implementations, processor 110 may include a plurality of processing units. These processing units may be physically located within the same device, or processor 110 may represent processing functionality of a plurality of devices operating in coordination. The processor 110 may be configured to execute modules 111, 112, 113, 114, and 115. Processor 110 may be configured to execute modules 111, 112, 113, 114, and 115 by software; hardware; firmware; some combination of software, hardware, and/or firmware; and/or other mechanisms for configuring processing capabilities on processor 110. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 111, 112, 113, 114, and 115 are illustrated in FIG. 1 as being implemented within a single processing unit, in implementations in which processor 110 includes multiple processing units, one or more of modules 111, 112, 113, 114, and 115 may be implemented remotely from the other modules. The description of the functionality provided by the different modules 111, 112, 113, 114, and 115 described below is for illustrative purposes, and is not intended to be limiting, as any of modules 111, 112, 113, 114, and 115 may provide more or less functionality than is described. For example, one or more of modules 111, 112, 113, 114, and 115 may be eliminated, and some or all of its functionality may be provided by other ones of modules 111, 112, 113, 114, and 115. As another example, processor 110 may be configured to execute one or more additional modules that may perform some or all of the functionality attributed below to one of modules 111, 112, 113, 114, and 115.

Wearable AR device 200 may include storage 270, one or more processors 210, and/or other components. Wearable AR device 200 may include communication lines, or ports to enable the exchange of information with a network and/or other computing platforms. Illustration of wearable AR device 200 in FIG. 2 is not intended to be limiting. Wearable AR device 200 may include a plurality of hardware, software, and/or firmware components operating together to provide the functionality attributed herein to wearable AR device 200.

Storage 270 may comprise non-transitory storage media that electronically stores information. The electronic storage media of storage 270 may include one or both of system storage that is provided integrally (i.e., substantially non-removable) with wearable AR device 200 and/or removable storage that is removably connectable to wearable AR device 200 via, for example, a port (e.g., a USB port, a firewire port, etc.) or a drive (e.g., a disk drive, etc.). Storage 270 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Storage 270 may include one or more virtual storage resources (e.g., cloud storage, a virtual private network, and/or other virtual storage resources). Storage 270 may store software algorithms, information determined by processor 210, information received from wearable device 200, and/or other information that enables wearable AR device 200 to function as described herein.

Processor(s) 210 is configured to provide information processing capabilities in wearable AR device 200. As such, processor 210 may include one or more of a digital processor, an analog processor, a digital circuit designed to process information, an analog circuit designed to process information, a state machine, and/or other mechanisms for electronically processing information. Although processor 210 is shown in FIG. 2 as a single entity, this is for illustrative purposes only. In some implementations, processor 210 may include a plurality of processing units. These processing units may be physically located within the same device, or processor 210 may represent processing functionality of a plurality of devices operating in coordination. The processor 210 may be configured to execute modules 211, 212, 213, 214, 215, and 216. Processor 210 may be configured to execute modules 211, 212, 213, 214, 215, and 216 by software; hardware; firmware; some combination of software, hardware, and/or firmware; and/or other mechanisms for configuring processing capabilities on processor 210. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 211, 212, 213, 214, 215, and 216 are illustrated in FIG. 2 as being implemented within a single processing unit, in implementations in which processor 210 includes multiple processing units, one or more of modules 211, 212, 213, 214, 215, and 216 may be implemented remotely from the other modules. The description of the functionality provided by the different modules 211, 212, 213, 214, 215, and 216 described below is for illustrative purposes, and is not intended to be limiting, as any of modules 211, 212, 213, 214, 215, and 216 may provide more or less functionality than is described. For example, one or more of modules 211, 212, 213, 214, 215, and 216 may be eliminated, and some or all of its functionality may be provided by other ones of modules 211, 212, 213, 214, 215, and 216. As another example, processor 210 may be configured to execute one or more additional modules that may perform some or all of the functionality attributed below to one of modules 211, 212, 213, 214, 215, and 216.

Server 400 may include storage, one or more processors, and/or other components. Server 400 may include communication lines, or ports to enable the exchange of information with a network and/or other computing platforms. Illustration of server 400 in FIGS. 1 and 2 are not intended to be limiting. Server 400 may include a plurality of hardware, software, and/or firmware components operating together to provide the functionality attributed herein to server 400. For example, server 400 may be implemented by a cloud of computing platforms operating together as server 400.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system comprising:
   a wearable device;
   a second device remote from and in communication with the wearable device;
   a processor configured to generate at least a first control signal and a second control signal representative of a first event and a second event, respectively, occurring in an environment related to the wearable device and/or the second device, the first event and the second event being different events; and
   a haptic output device configured to provide a first haptic feedback signal and a second haptic feedback signal based on the first control signal and the second control signal, respectively.

2. The system according to claim 1, wherein the second device is a second wearable device.

3. The system according to claim 1, wherein at least one of the first event and second event comprises an indication of a physical object within a predetermined proximity of the wearable device or the second device, an indication of an environmental condition occurring in the environment, an indication of a change in an environmental condition occurring in the environment, an indication of a movement of an object within the predetermined proximity of the wearable device or second device, an interaction between the wearable device or the second device and an object in the environment, or an indication that the wearable device or the second device recognizes an object in the environment.

4. The system according to claim 1, wherein the wearable device comprises the haptic output device.

5. The system according to claim 1, wherein the second device comprises the haptic output device.

6. The system according to claim 1, further comprising:
   a sensor configured to sense one or more environmental conditions related to the wearable device or the second device,
   wherein at least one of the first event and second event comprises the one or more environmental conditions sensed by the sensor.

7. The system according to claim 1, further comprising:
a communication port configured to establish a wireless or wired communication channel between the wearable device and the second device,
wherein the processor is configured to receive a signal representative of the first and second events occurring at the wearable device or the second device via the wireless or wired communication channel and generate the control signal based on the received signal.

8. The system according to claim 7, wherein the received signal comprises sensory information, and wherein at least one of the first event and second event comprises one or more environmental conditions based on the sensory information.

9. The system according to claim 8, wherein the received signal comprises information relating to a communication at the second device, and wherein at least one of the first event and second event comprises an indication of the communication at the second device.

10. A system comprising:
an augmented reality device configured to generate an augmented reality environment comprising an augmented reality space and a physical space, the augmented reality device comprising
a processor configured to detect a plurality of events that occur in the environment related to a wearable device, the processor configured to generate the augmented reality space coincident with the physical space,
recognize at least one physical object in the physical space and augment the at least one physical object with one or more virtual objects in the augmented reality space, and
determine an event associated with the augmented reality environment, and
generate a control signal based on the determined event;
the wearable device remote from and in communication with the augmented reality device;
a remote device remote from and in communication with the wearable device and the augmented reality device; and
a haptic output device configured to provide a plurality of haptic feedback signals based on the control signal.

11. The system according to claim 10, wherein the remote device is a second wearable device.

12. The system according to claim 10, wherein the event comprises an interaction with a virtual object, an interaction between the at least one physical object and the augmented reality environment, a confirmation of an action occurring with respect to the augmented reality environment, a confirmation that the at least one physical object is recognized by the augmented reality device, or a confirmation that an object in the physical space has been augmented.

13. The system according to claim 10, wherein the event comprises an indication of the at least one physical object within a predetermined proximity of the augmented reality device, an indication of an environmental condition occurring in an environment related to the augmented reality device, an indication of a change in the environmental condition occurring in the environment, or an indication of a movement of an object within the predetermined proximity of the augmented reality device.

14. The system according to claim 10, wherein the augmented reality device comprises the haptic output device.

15. The system according to chain 10, wherein the wearable device comprises the haptic output device.

16. Me system according to claim 10, wherein the remote device comprises the haptic output device.

17. A method comprising;
detecting an event in an environment, the detecting performed at least in part with a processor,
generating a control signal representative of an event occurring in the environment related to a wearable device and/or a second device with the processor, the generated control signal being a first control signal selected from at least first and second available control signals, the first control signal representative of the event, the second control signal representative of a different event; and
providing a plurality of haptic feedback signals based on the control signal with a haptic output device.

18. The method according to claim 17, wherein the second device is a second wearable device.

19. The method according to claim 17, wherein at least one of the event and the different event comprises an indication of a physical object within a predetermined proximity of the wearable device or the second device, an indication of an environmental condition occurring in the environment, an indication of a change in an environmental condition occurring in the environment, an indication of a movement of an object within a predetermined proximity of the wearable device or second device, an interaction between the wearable device or the second device and an object in the environment, or an indication that the wearable device or the second device recognizes an object in the environment.

20. The method according to claim 17, wherein the wearable device comprises the haptic output device and the haptic feedback is provided at the wearable device.

21. The method according to claim 17, wherein the second device comprises the haptic output device and the haptic feedback is provided at the second device.

22. The method according to claim 17, further comprising:
sensing one or more environmental conditions related to the wearable device or the second device with a sensor,
wherein at least one of the event and the different event comprises the one or more environmental conditions sensed by the sensor.

23. The method according to claim 17, further comprising:
establishing a wireless or wired communication channel between the wearable device and the second device with a communication port; and
receiving a signal representative of at least one of the event and the different event occurring at the wearable device or the second device via the wireless or wired communication channel and generate the control signal based on the received signal with the processor.

24. The method according to claim 23, wherein the received signal comprises sensory information, and wherein at least one of the event and the different event comprises one or more environmental conditions based on the sensory information.

25. The method according to claim 24, wherein the received signal comprises information relating to a communication at the second device, and wherein at least one of the event and the different event comprises an indication of the communication at the second device.

26. A method comprising:
generating an augmented reality environment comprising an augmented reality space and a physical space with an augmented reality device, said generating comprising
  generating the augmented reality space coincident with the physical space with a processor,
  recognizing at least one physical object in the physical space and augmenting the at least one physical object with one or more virtual objects in the augmented reality space with the processor,
  detecting at least one event associated with the augmented reality environment with the processor, and
  generating a control signal based on the at least one event with the processor; and
providing a plurality of haptic feedback signals based on the control signal with a haptic output device of the augmented reality device, a wearable device remote from and in communication with the augmented reality device, or a remote device remote from and in communication with the wearable device and the augmented reality device.

27. The method according to claim 26, wherein the remote device is a second wearable device.

28. The method according to claim 26, wherein the event comprises an interaction with a virtual object, an interaction between the at least one physical object and the augmented reality environment, a confirmation of an action occurring with respect to the augmented reality environment, a confirmation that the at least one physical object is recognized by the augmented reality device, or a confirmation that an object in the physical space has been augmented.

29. The method according to claim 26, wherein the event comprises an indication of the at least one physical object within a predetermined proximity of the augmented reality device, an indication of an environmental condition occurring in an environment related to the augmented reality device, an indication of a change in all environmental condition occurring in the environment, or an indication of a movement of an object within a predetermined proximity of the augmented reality device.

* * * * *